US006679109B2

(12) United States Patent
Gierling et al.

(10) Patent No.: US 6,679,109 B2
(45) Date of Patent: Jan. 20, 2004

(54) ACOUSTIC RECOGNITION OF VARIATOR SLIP OF A CONTINUOUSLY VARIABLE TRANSMISSION

(75) Inventors: Armin Gierling, Langenargen (DE); Thomas Fichtinger, Meckenbeuren (DE); Norbert Inerle, Tettnang (DE)

(73) Assignee: ZF Batavia LLC, Batavia, OH (US)

( * ) Notice: Subject to any disclaimer, the term of this patent is extended or adjusted under 35 U.S.C. 154(b) by 118 days.

(21) Appl. No.: 09/998,687

(22) Filed: Nov. 29, 2001

(65) Prior Publication Data

US 2002/0095992 A1 Jul. 25, 2002

(30) Foreign Application Priority Data

Nov. 30, 2000 (DE) .......................... 100 59 450

(51) Int. Cl.[7] ............................................. G01M 15/00
(52) U.S. Cl. ..................................................... 73/118.1
(58) Field of Search .............................. 73/116, 117.2, 73/117.3, 118.1, 119 R

(56) References Cited

U.S. PATENT DOCUMENTS

| 5,698,796 | A |   | 12/1997 | Hirano ..................... 73/862.41 |
| 5,750,477 | A | * | 5/1998  | Sumiejski et al. ........... 508/331 |
| 5,871,411 | A |   | 2/1999  | Senger et al. ................. 474/11 |
| 6,146,294 | A |   | 11/2000 | Bolz .............................. 474/8 |
| 6,251,043 | B1 | * | 6/2001 | Gierling ..................... 477/115 |

FOREIGN PATENT DOCUMENTS

| DE | 41 38 603 A1 | 5/1993  | ......... F16H/61/14 |
| DE | 44 11 628 A1 | 10/1995 | ......... F16H/59/06 |
| DE | 196 38 277 A1 | 3/1998 | ......... F16H/59/06 |
| DE | 196 16 574 C2 | 4/1998 | ............ F16H/7/08 |
| DE | 100 62 224 A1 | 4/2001 | ......... F16H/61/12 |

* cited by examiner

Primary Examiner—Eric S. McCall
(74) Attorney, Agent, or Firm—Davis & Bujold, PLLC

(57) ABSTRACT

Within the scope is a method for detecting the variator slip in continuously variable transmission (CVT transmission). The tribologic slip is detected by monitoring a rotating variator according to vibration and a subsequent evaluation.

14 Claims, 1 Drawing Sheet

ACOUSTIC RECOGNITION OF VARIATOR SLIP OF A CONTINUOUSLY VARIABLE TRANSMISSION

FIELD OF THE INVENTION

The invention concerns a method for recognition of the variator slip in continuously variable transmissions (CVT transmissions).

BACKGROUND OF THE INVENTION

CVT transmissions have a variator for continuously variable adjustment of the ratio. A customary structure is a belt drive variator having two pairs of beveled pulleys and rotating a torque-transmitter element therein, such as a pushing linked band or a chain. The beveled pulleys are loaded with pressure from the transmission oil pump in order, on one hand, to actuate the ratio adjustment and, on the other, to ensure a contact pressure needed for transmission of the torque upon the belt drive element.

Another usual structure is a swash plate variator in semi-toroidal or fully toroidal design.

An efficient operation of the variator requires a contact pressure calculation as exact as possible and that satisfies the requirements. The contact pressure needed for a reliable torque transmission is, in essence, a function of the variator geometry, of the friction ratios between band and beveled pulleys, the applied transmission input torque of the rotational speed of the pulleys and of the variator ratio and is usually calculated by an electronic transmission control of the CVT, according to the operating point.

The electronic transmission control receives the torque information, for ex., via a torque sensor inside the transmission on the variator or via an engine torque signal of the electronic engine control (for ex., as CAN signal). Both methods are relatively inaccurate, especially in dynamic operation, with the consequence of that over tightening of the variator is detrimental to the degree of efficiency.

DE-A 44 11 628 has disclosed a method in which the contact pressure of a belt drive variator is adjusted via a slip regulation of the belt drive means. At the same time, the variator slip is determined by means of rotational speed sensors disposed respectively on a primary pulley and a second pulley of the variator.

From DE-A 41 38 603 has become known to determine indirectly the operation state of a vehicle equipped with automatic transmission and lock-up clutch by means of a sensor of solid borne sound situated on the rear axle suspension of the transmission in order then to control the slip of the lock-up clutch so as to prevent humming noises and vehicle jolt phenomena. The disadvantage of this method is that the values determined are often inaccurate. The inaccuracy is not relevant for the slip control of a converter lock-up clutch since, in the case of doubt, the slip having been set too high is borne without problem by the lock-up clutch. Thus, it is not possible to apply the method without problem to a variator where, on one hand, the slip has to be prevented and, on the other, the contact pressure level has to be kept as close as possible to the slip limit.

Therefore, this invention is based on the problem of outlining a method which makes possible the control of the variator pressure as needed by detecting the exact variator slip.

It is accordingly proposed to detect the variator slip by monitoring and estimating the rotating variator according to vibration and by a subsequent evaluation.

The inventive solution is shown by way of example with reference to a belt drive variator having a pushing linked band. But the range of application of the invention extends to all types of variators for mechanical torque transmission.

BRIEF SUMMARY OF THE INVENTION

The present invention is directed to a method for detection of variator slip in a continuously variable transmission by monitoring a vibration generated by a rotation of the continuously variable transmission and determining a tribologic slip of the continuously variable transmission by evaluation of the monitored vibration.

BRIEF DESCRIPTION OF THE DRAWINGS

The foregoing and other objects, features and advantages of the present invention will be apparent from the following description of the invention and embodiments thereof, as illustrated in the accompanying figures, wherein.

DETAILED DESCRIPTION OF THE INVENTION

Figure 1:
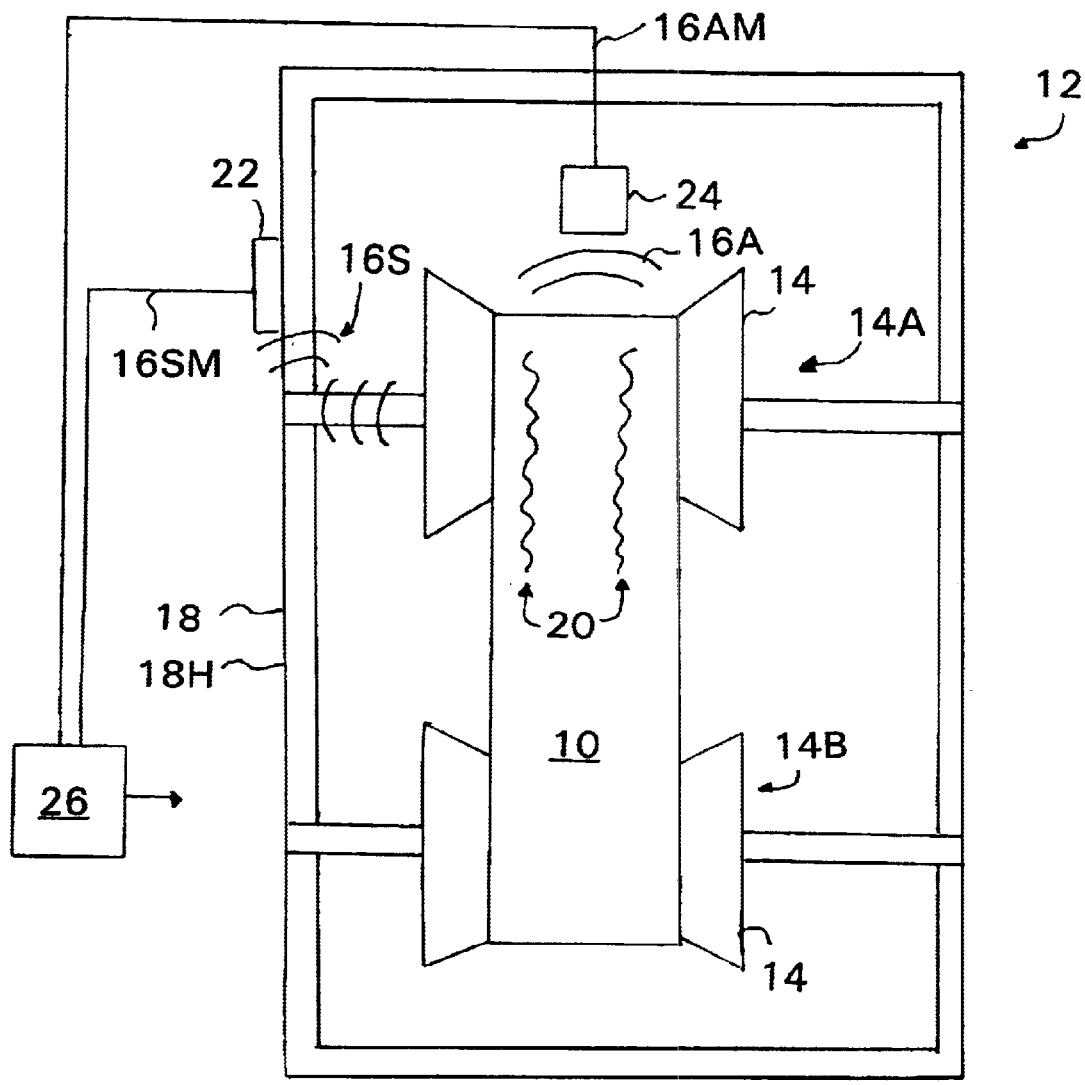
FIG. 1 is a diagrammatic illustration of the present invention implemented in a continuously variable transmission.

Referring to FIG. 1, in the band-pulley contact, it is fundamental to differentiate between geometric and tribologic slip. Geometric slip results by a planned ratio adjustment, that is, the band 10 is purposefully guided to a different running radius. Geometric slip is understood as divergence from the ideal ratio, as a consequence of elasticities of the variator 12 and the belt drive means (band 10), while the torque does not circulate. Tribologic slip results from a relative movement between pushing linked element (band 10) and pulley 14 in pitch-line contact.

During a torque transmission, there always physically exists on the band-pulley contact a tribologic micro-slip, the admissible magnitude of which depends on the operating point and on the kinds and design of the belt drive element (band 10). With the detection of incipient tribologic macro-slip, that is, when the slip surpasses the admissible magnitude of 5%, for ex., there exists a reliable information about a descending contract pressure. The admissible slip here is a function of the ratio. Depending on the ratio, the macro-slip appears on different places with variator 12 ratio $iV = n\_primary/n\_secondary > 1$ on the primary side and with $iV < 1$ on the secondary side.

According to the invention, solid borne sound 16S and air borne sound 16A methods can be used as vibration 20 measuring methods. The solid borne sound 16S is conveniently measured on the variator 12 support 18 (on the primary and/or secondary side 14A, 14B) as shaft/pulley vibration 20. Within the scope of a variant of this invention, the solid borne sound 16S is measured on the transmission housing 18H by solid borne sound measurement 22.

The immediate environment of the variator 12, especially of the band 10, is provided as a measuring place 24 for air borne sound 16A.

Other measurable variables for determining the actual ratio are the rotational speeds of the variator 12 on the primary 14A and the secondary 14B sides. For determining the inventive slip, no added expenses are required since both sensors for the ratio regulation of the transmission are usually already installed.

The measured vibration signals 16SM, 16AM deliver the band 10 frequency. The actual band 10 velocity is calculated from the band 10 frequency and the link thickness of the band 10 or the link length of the chain. The actual band 10 slip now results from the comparison between the actual band 10 velocity and a theoretical band 10 velocity calculated from the measured rotational speed ratio n-primary/n_secondary and the variator 12 geometry.

In a variant of the vibration evaluation, it can be provided that the actual band 10 slip be determined by a comparison between a theoretical and an actual variator 12 ratio. Therefore, the (actual) variator 12 ratio resulting from the measured rotational speeds of the variator 12 is compared with the (theoretical) variator 12 ratio appearing as a result of the band 10 velocity and the running radius.

Since geometric and tribologic slips overlap, an adequate differentiation is provided according to the invention. The knowledge of an existing variator 12 adjustment results, for ex., from the iV-regulator contact of the ratio regulation of the electronic transmission control 26 or from the requirement according to driving strategy in the existing operating point. The vibration measurement is accordingly estimated during the evaluation.

According to the invention, typical vibration features are identified in the vibration signal 16SM, 16AM which result from tribologic slip in the band-pulley contact. The frequency analysis delivers typical frequencies conditioned by tribologic slip. Analyses in the time domain deliver typical tribologically determined patterns in the time signal. According to the invention, adequate reference values for estimating the measured values are stored in the electronic transmission control (EGS) 26.

Within the scope of one variant, an additional modal analysis of the variator 12 and/or of parts surrounding the variator 12 (such as a transmission housing) can be provided in order, for ex., to select preferred measuring points or to purposefully take into account influences of stiffnesses of parts.

The actual variator 12 slip determined can then be used for other functions of the transmission such as calculation of the variator 12 contact pressure and of the ratio adjustment in the EGS.

In addition, divergences specific to the specimen of the actual transmission capacity of the variator 12 from the theoretical transmission capacity of the variator 12 can also be identified in the transmission and the engine-transmission combination.

By suitable accumulation of classified operation states, conclusion can be drawn as to a state of wear of the belt drive means or of the variator pulleys.

The inventive method can also be used for transmission diagnosis and early detection of damage for control of substitute functions of the contact pressure calculation, for control of substitute functions in case of failure of the engine torque signal of the electronic engine control and for control of a substitute function "Motor aus" in the case of detected mechanical damages of the transmission, especially in relation to a forward clutch on the output side.

What is claimed is:

1. A method for detection of variator slip in a continuously variable transmission, the method comprising the steps of:
   monitoring a vibration generated by a rotation of the continuously variable transmission; and
   determining a tribologic slip of the continuously variable transmission by evaluation of the monitored vibration.

2. The method according to claim 1, further comprising the step of using monitoring the vibration by detecting a solid borne noise resulting from the vibration of the variator.

3. The method according to claim 2, further comprising the step of measuring solid borne noise of a variator support.

4. The method according to claim 2, further comprising the step of measuring solid borne noise of a transmission housing.

5. The method according to claim 1, further comprising the step of measuring an air borne noise in an environment of the variator wherein a measurement of the air borne noise represents the monitored vibration representing the tribologic slip of the variator.

6. The method according to claim 1, further comprising the step of detecting the tribologic slip of the variator by evaluation, in an electronic transmission control, of vibration measurements of the variator.

7. The method according to claim 1, further comprising the steps of:
   determining an actual band frequency from a measurement of the vibrations;
   determining an actual band velocity from the actual band vibration noise frequency;
   determining a theoretical band velocity from a geometry of the variator and a measured rotational speed ratio between a primary side of the variator and a secondary side of the variator, and
   determining the tribologic slip by a comparison between the theoretical band velocity and the actual band velocity.

8. The method according to claim 1, further comprising the steps of:
   determining an actual band frequency from vibration measurements;
   determining a theoretical variator ratio from said actual band frequency;
   determining an actual variator ratio from a measured rotational speed ratio between a primary side of the variator and a secondary side of the variator, and
   determining the tribologic slip by a comparison between the actual variator ratio and the theoretical variator ratio.

9. The method according to claim 7, further comprising the steps of determining the tribologic slip by means of a frequency analysis, and comparing conditioned tribologically vibration features with air values stored in an electronic transmission control.

10. The method according to claim 7, further comprising the steps of determining the tribologic slip by means of an analysis of a time domain of signals of vibration measurements, and comparing conditioned tribologically vibration features with air borne sound values stored in an electronic transmission control.

11. The method according to claim 9, further comprising the step of carrying out a module analysis of the variator.

12. The method according to claim 9, further comprising the step of carrying out a module analysis of adjacent parts surrounding the variator.

13. The method according to claim 10, further comprising the step of carrying out a module analysis of the variator.

14. The method according to claim 10, further comprising the step of carrying out a module analysis of adjacent parts surrounding the variator.

\* \* \* \* \*